No. 626,571. Patented June 6, 1899.
F. B. SHUSTER.
HEDDLE MAKING MACHINE.
(Application filed Nov. 3, 1898.)

(No Model.) 8 Sheets—Sheet 1.

Fig. 1.

WITNESSES
INVENTOR
Franklin B. Shuster
By his Atty.
Geo. D. Phillips

No. 626,571. Patented June 6, 1899.
F. B. SHUSTER.
HEDDLE MAKING MACHINE.
(Application filed Nov. 3, 1898.)
(No Model.) 8 Sheets—Sheet 2.

No. 626,571. Patented June 6, 1899.
F. B. SHUSTER.
HEDDLE MAKING MACHINE.
(Application filed Nov. 3, 1898.)
(No Model.) 8 Sheets—Sheet 4.

WITNESSES
H. A. Lamb
David M. Lackie

INVENTOR
Franklin B. Shuster
By his Atty,
Geo. D. Phillips

No. 626,571. Patented June 6, 1899.
F. B. SHUSTER.
HEDDLE MAKING MACHINE.
(Application filed Nov. 3, 1898.)

(No Model.) 8 Sheets—Sheet 5.

WITNESSES
H. H. Lamb
David M. Lackie

INVENTOR
Franklin B. Shuster
By his Atty,
Geo. D. Phillips.

No. 626,571. Patented June 6, 1899.
F. B. SHUSTER.
HEDDLE MAKING MACHINE.
(Application filed Nov. 3, 1898.)
(No Model.) 8 Sheets—Sheet 6.

WITNESSES
H. A. Lamb
David M. Lackie

INVENTOR
Franklin B. Shuster
By his Atty.
Geo. D. Phillips.

THE NORRIS PETERS CO., PHOTO-LITHO., WASHINGTON, D. C.

No. 626,571. Patented June 6, 1899.
F. B. SHUSTER.
HEDDLE MAKING MACHINE.
(Application filed Nov. 3, 1898.)
(No Model.) 8 Sheets—Sheet 7.

WITNESSES
H. H. Lamb
David M. Lackie

INVENTOR
Franklin B. Shuster
By his Atty.
Geo. D. Phillips.

No. 626,571. Patented June 6, 1899.
F. B. SHUSTER.
HEDDLE MAKING MACHINE.
(Application filed Nov. 3, 1898.)
(No Model.) 8 Sheets—Sheet 8.

WITNESSES
H. A. Lautz
David M. Lack

INVENTOR
Franklin B. Shuster
By his Atty,
Geo. D. Phillips

UNITED STATES PATENT OFFICE.

FRANKLIN B. SHUSTER, OF NEW HAVEN, CONNECTICUT, ASSIGNOR TO THE J. H. WILLIAMS COMPANY, OF UTICA, NEW YORK.

HEDDLE-MAKING MACHINE.

SPECIFICATION forming part of Letters Patent No. 626,571, dated June 6, 1899.

Application filed November 3, 1898. Serial No. 695,375. (No model.)

*To all whom it may concern:*

Be it known that I, FRANKLIN B. SHUSTER, a citizen of the United States, and a resident of New Haven, in the county of New Haven and State of Connecticut, have invented certain new and useful Improvements in Heddle-Machines, of which the following is a specification.

My invention relates to an automatic machine for making heddles; and it consists in certain details of construction to be more fully set forth in the following specification and such features believed to be new and novel particularly pointed out in the claims.

In order that those skilled in the art to which my invention appertains may fully comprehend its object and construction, reference is had to the accompanying drawings, in which—

Fig. 4ᵃ is a detail side elevation of the wire-feed ratchet-wheel and sectional view of the lower feed-roll shaft through line *g* of Fig. 4. Fig. 13 is an upper detail plan view of what is shown at Fig. 12, showing also broken view of the levers that operate the several parts referred to.

The construction and operation are as follows:

1 represents the bed of the machine.

2, 2ª, and 3 are brackets at the rear of the bed to support the driving-shaft 4 and the cam-shaft 5. The said shafts project beyond the bracket 3 and are shown as broken at Fig. 1. On these projecting ends, but not shown, are gears which transmit motion from the driving-shaft 4 to the cam-shaft 5, and on the outside of the gear on the said driving-shaft is also the driving-pulley. (Not shown.)

6 is a bevel-gear on the end of the cam-shaft which registers with the bevel-gear 7 of the short shaft 8, mounted in the standard 9 at the extreme left of the bed. The shaft 8 carries the cam-plate 10.

11 is a lever pivotally mounted in the standard 12, which lever carries on one end the roll 13 to engage with a cam-groove in the said cam-plate, while the other end is provided with the segment-gear 14, adapted to register with the pinion 15, mounted on the short shaft 16, journaled in the standards 17.

18 is a gear mounted on the opposite end of shaft 16, which gear registers with the pinion 19, mounted loosely on the lower feed-roll shaft 20. This shaft, together with the upper feed-roll shaft 21, is mounted in the standards 22 and 23.

Figure 1:
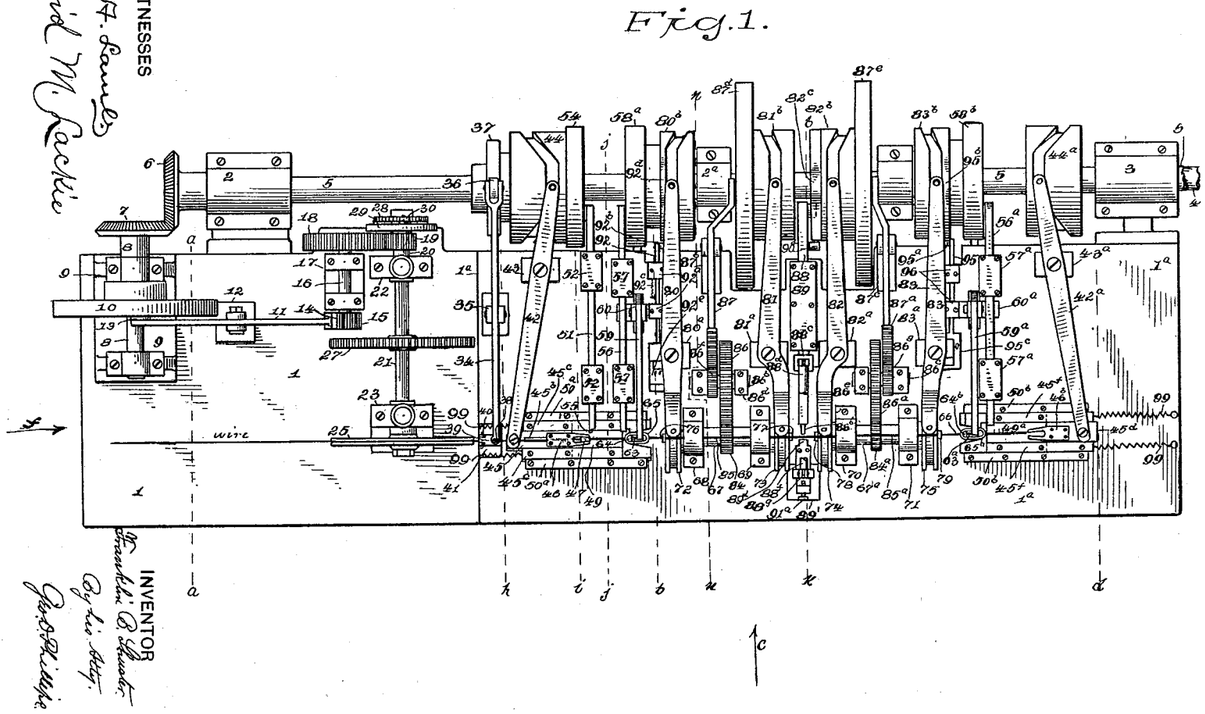
Figure 1 represents an upper plan view of the machine, showing part of the mechanism for forming the warp-eye removed, also broken view of the driving-shaft and cam-shaft.

24 and 25 are the wire-feed rolls. (See Figs. 2 and 4.) The two-feed roll shafts are connected together by means of the gears 26 and 27. On the outer projecting end of the lower feed-roll shaft 20 is the ratchet-feed, consisting (see also Fig. 4ª) of the ratchet-gear 28, rigidly attached to the shaft 20. 29 is a plate loosely mounted on said shaft and rigidly connected or integral with the pinion 19, and it carries the pawls 30 and 31, adapted to engage with the said ratchet-wheel, and the same are held in engagement by their springs 32 and 33. When, therefore, the cam-shaft 5, Fig. 1, is running to operate the mechanism necessary to make the heddle, it will also communicate a continuous motion to the short shaft 8 through the medium of the bevel-gears 6 and 7, before mentioned. The cam-groove (not shown) in the face of the cam-plate 10 will give an intermittent motion to the wire-feed rolls through the medium of the vibratory movement of the segment-lever 11. One stroke of this lever in the direction of arrow w, Fig. 2, will through the medium of the gears cause the feed-rolls 24 and 25 to rotate sufficiently to feed forward an amount of wire to make one complete heddle. The return movement of the segment-lever 11 to its normal position (shown at Fig. 2) will cause the pawls 30 and 31 to slip over the teeth of the ratchet-wheel 28 and be in readiness to reëngage therewith on the next forward stroke.

Figures 4, 4A, 5:
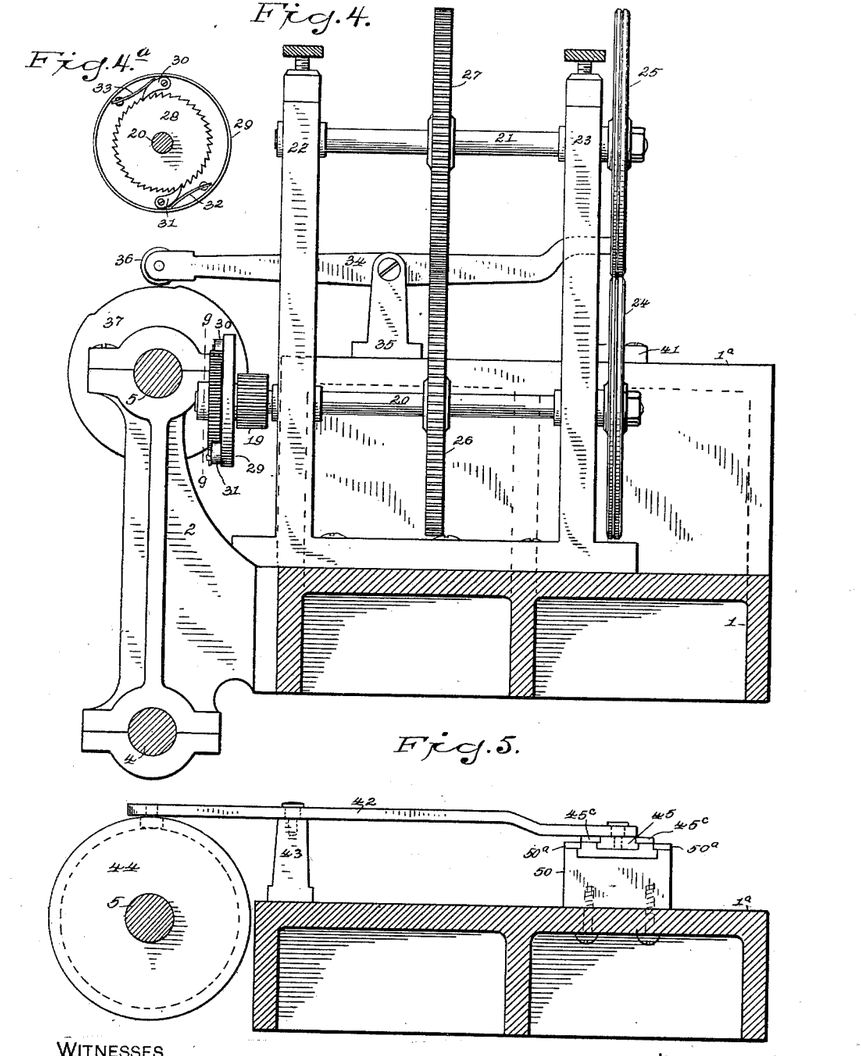
Fig. 4 is a sectional end elevation of the machine-bed and the driving-shaft and cam-shaft through line *a* of Fig. 1, looking in the direction of arrow *f*, showing also side elevation of the feed-roll mechanism mounted in its standard with all of the intervening mechanism between line *a* and said standard removed. In this view is also shown a side elevation of the wire-clamping lever pivotally supported in its standard mounted on a raised portion of the machine-bed, also the operating-cam for such lever mounted on the cam-shaft.
Fig. 5 is a cross-section of the machine-bed and cam-shaft through line *h* of Fig. 1, showing side elevation of one of the slide-operating levers and its operating-cam, looking in the direction of arrow *f* of Fig. 1.

34, Figs. 1 and 4, is a lever pivotally supported in the standard 35 on the upper surface of the raised portion 1ª of the bed. The rear end of said lever carries the roll 36, adapted to engage the cam 37 on the shaft 5. The opposite end of this lever carries the adjusting-screw 38. (See also Figs. 2 and 12.) 39 is a wire-clamp pivotally supported on the pin 40 of the standard 41, against which clamp the said screw 38 is adapted to engage at the proper time to grip the wires and prevent their being withdrawn on return of the feeding mechanism.

Figure 21:
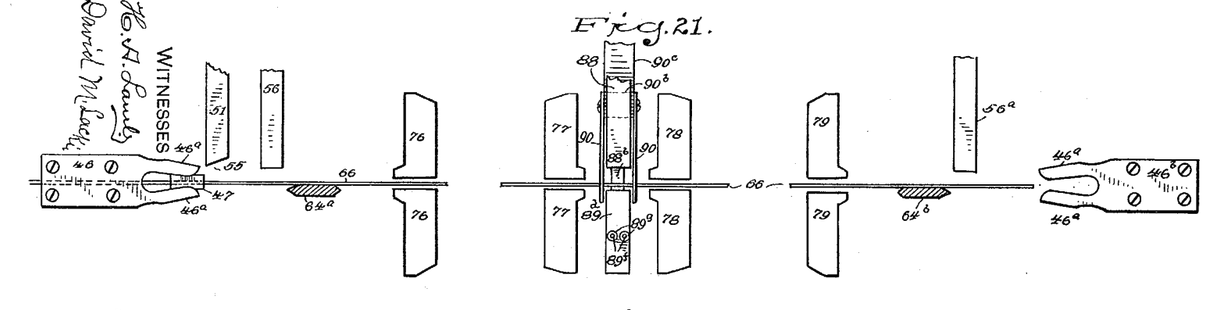
Fig. 21 is an enlarged detail view of the several chuck-jaws and their relation to the heddle-wire with which they engage, broken sections of the cutting-off tool, bending-tools, warp-eye-piercing tool engaged with the wire, broken view of its carrier-bar, wire-centering device, and broken view of its carrier-bar, sectional view of the formers through line q of Fig. 16, plan view of the end folders, and broken sections of the heddle-wires.
Figures 22, 23, 24, 26, 27:
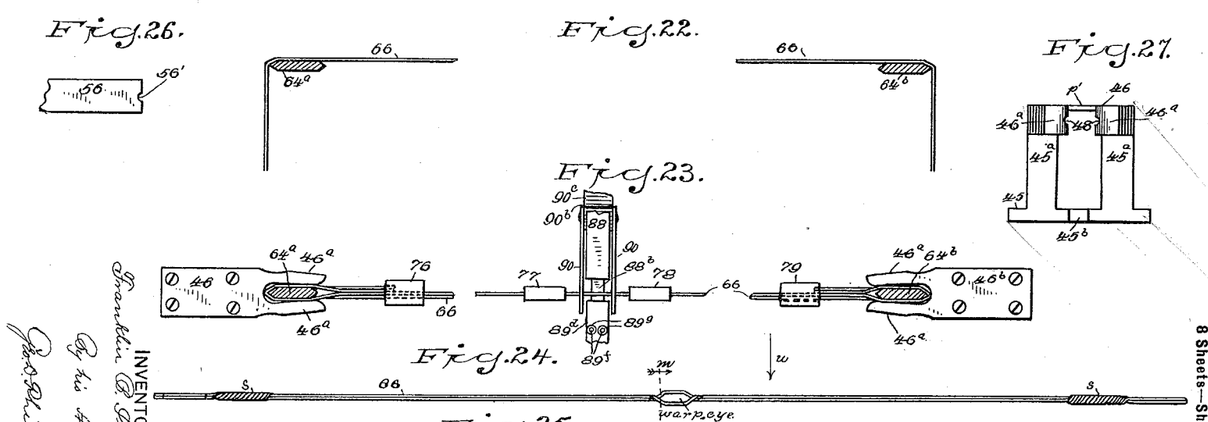
Fig. 22 is an enlarged broken detail view of the heddle-wires and cross-section of the formers, showing the first operation of forming the rod-eyes by bending the ends of the wire at right angles to its feeding-line.
Fig. 23 is an enlarged detail view similar to the one shown at Fig. 21, showing the manner in which the rod-eyes are formed.
Fig. 24 is one view of a completed heddle.
Fig. 26 is an enlarged broken detail view of one of the wire-bending tools.
Fig. 27 is an enlarged detail end elevation of one of the end folders for the rod-eyes.

42, Figs. 1 and 5, is a lever pivotally supported on the standard 43 and carries a roll at its rear adapted to operate in the grooved cam 44. The forward end of said lever is pivotally supported to the slide 45, as shown. (See also Figs. 2, 12, and 13.) This slide carries the folder 46, (seen also at Figs. 17, 21, 22, 23, and 27,) adapted to bend the end of the wire around the former, presently to be more fully described. This folder is attached to the uprights 45ª of the said slide at the sides, while its central portion $p'$, Fig. 27, is made quite thin, in conjunction with the slot $45^b$ of said slide, to permit said folder passing over the wire-guide 47, presently to be more fully described. The folder is provided with the spring-jaws $46^a$, whose inner faces have the grooves 48 to receive the wire.

Figure 12:
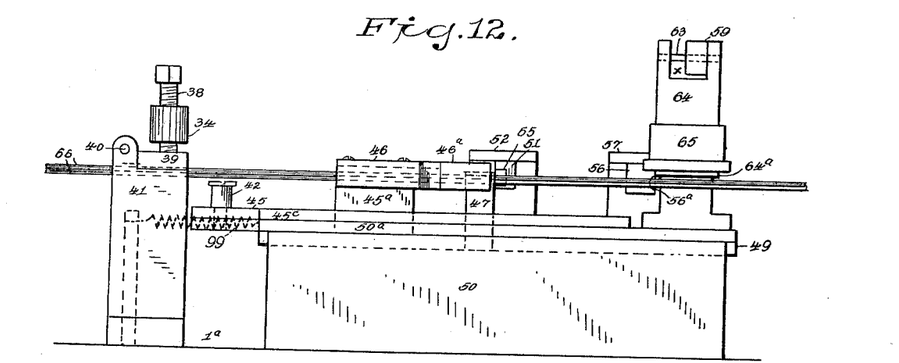
Fig. 12 is an enlarged detail front elevation of the wire-clamping fixture, support carrying the two slides that operate to form the rod-eye of the heddle, former, and its guide-support as shown at Fig. 2.
Figure 13:
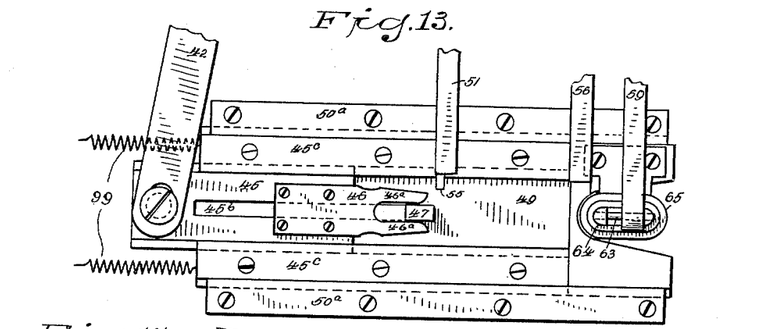

49, Figs. 12 and 13, is the lower slide, in which the slide 45 operates, while the slide 49 operates in the support 50, projecting from the raised portion of the bed. The wire-guide 47 projects from this first or lower slide and is provided with the hole $47^a$ therethrough, Fig. 6, to admit the wire. The caps $50^a$ hold the slide 49 in place, while the caps $45^c$ hold the slide 45 in working engagement with the slide 49.

Figure 6:
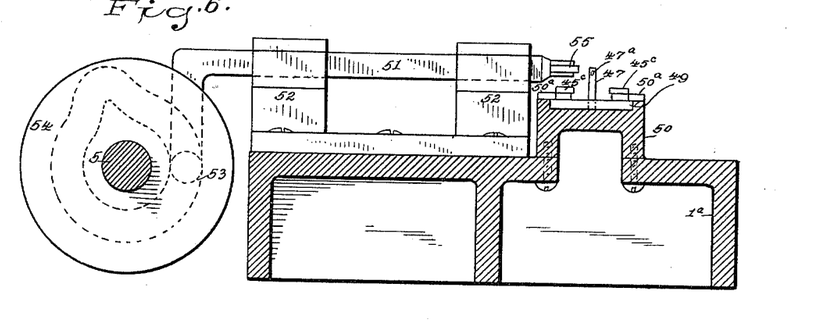
Fig. 6 is a cross-section of the bed and cam-shaft on line *i* of Fig. 1, looking in the direction of arrow *f*, showing side elevation of the cutting-off-tool bar and its operating-cam, also end elevation of the wire-guide against which the cutting-off-tool operates to sever the wire.

51, Figs. 1 and 6, is the cutter-bar, operatively mounted in the standards 52. The rear end of this bar is provided with the roll 53, which engages with the cam 54. 55 is the cutter in the end of said bar and is adapted to operate against the inner face of the before-mentioned wire-guide 47 to sever the wire.

Figure 7:
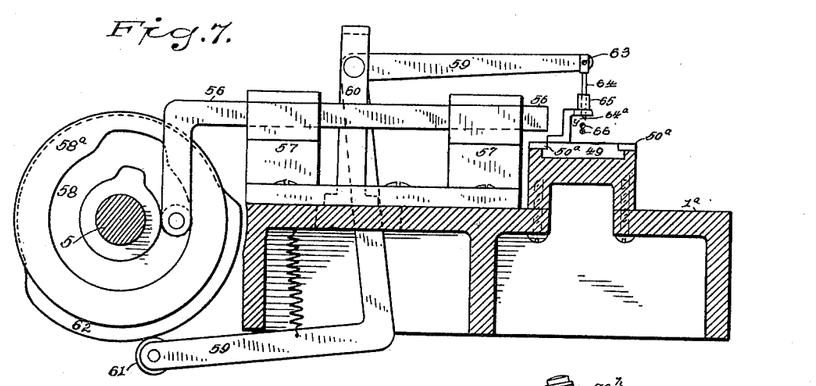
Fig. 7 is a cross-section of the bed and cam-shaft through line *j* of Fig. 1, looking in the direction of arrow *f*, showing side elevation of one of the initial bending-tools and its operating-cam and one of the vertically-operating formers for forming one of the rod-eyes of the heddle, guide for said former, and lever to which said former is pivoted.

56, Figs. 1 and 7, is one of the bending-bars operating in the standards 57 and is controlled and governed in its reciprocating movements by the cam-groove 58 of the cam $58^a$. The end of this bar (see also Figs. 21 and 22) is adapted to engage the end of the wire and bend the same over the former 64, presently to be described.

$56^a$, Fig. 1, is a similar bending-bar to the one just described, being mounted in the standards $57^a$ and is adapted to engage in the same manner with the cam $58^b$.

Figures 16, 17:
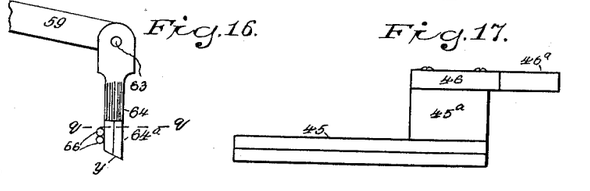
Fig. 16 is an enlarged detail side elevation of one of the formers, shown as depressed, with the heddle-wires forced to the rear thereof, also broken view of its operating-lever.
Fig. 17 is an enlarged detail view of one of the folders for closing the end of the wire about the former to make the rod-eye.

59, Figs. 1 and 7, is one of the levers that control the movements of the vertically-operating rod-eye formers, presently to be described. 60 is a standard in which said lever is pivotally supported. Said lever extends below the bed and carries the roll 61 to engage with the cam portion 62 of the cam $58^a$. The forward end of this lever is connected to the pin 63 (see also Figs. 2, 12, 13, and 16) of the forked end of the former 64. The lower end $64^a$ of the former is diamond shape, as shown at Figs. 7 and 16, so as to give an equivalent form to the rod-eye in the end of the heddle. 65 is a bracket attached to the slide 49, in which bracket such former is adapted to have a vertical movement. The wires 66, of which the heddle is made, are of double strands and are soldered together, so as to make practically a single wire. These wires being fed through the axis of the machine, of which the center of the said former is in a direct line, necessitates the beveling of the lower end of this former at $y$, so that when said former descends to its lowest vertical position, as shown at Fig. 16, this beveled end will force said wires to one side of said former, as shown, in readiness to be folded thereabout.

The mechanism on the opposite end of the machine necessary to form the other rod-eye is precisely similar to that just described, except that the cutting-off tool and its appurtenances are omitted. A brief description, therefore, of these similar parts will suffice.

Figure 3:
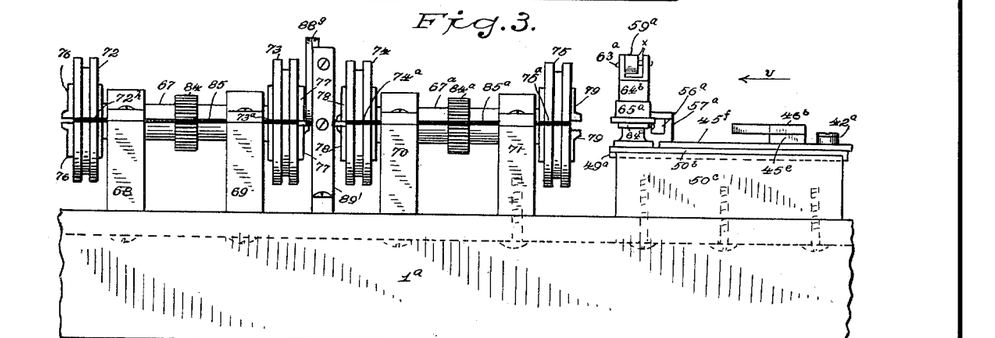
Fig. 3 is a broken front elevation of the other part of the machine from line *b* to line *d* of Fig. 1, looking in the direction of arrow *c*, showing the operating-cams and segment-levers for rotating the winding-shafts removed.

$42^a$, Figs. 1 and 3, is the lever, mounted on the standard $43^a$, and it is operated by the cam $44^a$, that operates the slide $45^d$, which slide carries the other folder $46^b$, mounted upon the supports $45^e$. $49^a$ is the lower slide, and $45^f$ and $50^b$ are the caps for holding them in place, all mounted on the support $50^c$. The lower end of the former $64^b$ is also diamond shape, as shown at Figs. 21, 22, and 23. The forked end of this former also carries the pin $63^a$, to which pin is connected the operating-lever $59^a$, mounted upon its standard $60^a$ and engaging the cam $58^b$ of shaft 5.

67 and $67^a$, Figs. 1 and 3, are the twister or winding shafts, journaled in the standards 68, 69, 70, and 71. On the outer end of these shafts are rigidly mounted the wire-holding chucks 72, 73, 74, and 75, whose jaws 76, 77, 78, and 79 (see also Figs. 21 and 23) are controlled by the forked levers 80, 81, 82, and 83, mounted on their standards $80^a$, $81^a$, $82^a$, and $83^a$, and said levers are operated by their respective cams $80^b$, $81^b$, $82^b$, and $83^b$, mounted upon the cam-shaft 5. 84 and $84^a$ (see also Fig. 11) are pinions integral with the said winding-shafts and are thus made integral by reason of the fact that the shafts, as well as the chucks, are provided with the slots 85 $85^a$, which slots extend just beyond the center of said shafts for the reception, as well as the delivery, of the heddle-wires, presently to be more fully described. These pinions are engaged by the gears 86 and $86^a$, mounted on the shafts $86^b$ and $86^c$ of the standards $86^d$ and $86^e$. On these shafts are also mounted the pinions $86^f$ and $86^g$, adapted to be engaged by the segment-levers 87 and $87^a$, which levers in turn are pivotally supported in the standards $87^b$ and $87^c$ and are operated by the cams $87^d$ and $87^e$ on the cam-shaft 5. These levers will impart a reciprocating motion to the winding-shafts just described.

Figure 9:
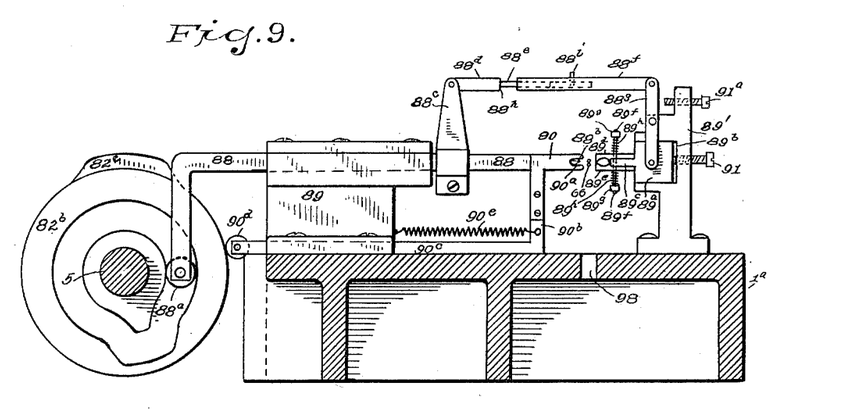
Fig. 9 is a cross-section of the bed and cam-shaft on line *k* of Fig. 1, looking in the direction of arrow *f*, showing the mechanism for forming the central or warp eye in the heddle and side elevation of one of the central wire-holding chucks.
Figures 10, 11:
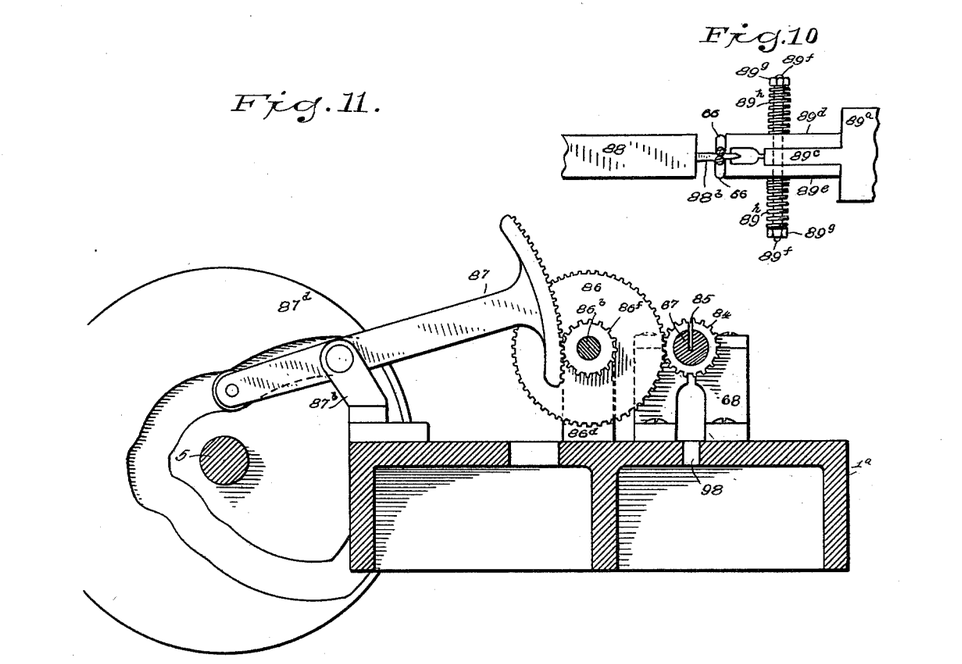
Fig. 10 is an enlarged broken detail view of the bar carrying the warp-eye-piercing tool, sectional view of the heddle-wire through line *m* of Fig. 24, side elevation of the anvil-jaws with the wire thereagainst, and the eye-forming tool engaging such wire to form the eye, also broken view of the adjustable block to which said jaws are operatively secured.
Fig. 11 is also a cross-section of the bed and cam-shaft and one of the winding-shafts through line *n* of Fig. 1, looking in the direction of arrow *f*, showing the mechanism for operating said winding-shaft.

The mechanism necessary to form the warp-eye of the heddle is shown at Figs. 1, 9, and 10. 88 is a bar operating in the standard 89. One end of this bar carries the roll $88^a$ to engage a groove in the vertical face of the cam $82^b$. $88^b$ is the eye-forming tool, projecting from the inner end of said bar. $88^c$ is an arm adjustably secured to said bar. To the upper end of this arm is attached the rod $88^d$, having a reduced portion $88^e$ adapted to operate in a hole provided in the end of the rod $88^f$. $88^g$ is a lever pivoted to the standard $89'$ and to the said rod $88^f$, while the lower end of said lever is pivoted to the sliding block $89^a$, adapted to operate in the opening $89^b$ of said standard. $89^c$ is a tongue projecting from said sliding block, which tongue supports the upper and lower anvil-jaws $89^d$ and $89^e$. These jaws are operatively secured to said tongue by means of the vertical rods $89^f$, extending loosely through said jaws and tongue. These rods (see particularly Figs. 9 and 10) are surmounted by the adjusting-nuts $89^g$, while the springs $89^h$ are placed on said rods between said nuts and jaws, so that said jaws will be forced open against the closing tension of said springs.

On each side of the bar 88, Figs. 9, 21, and 23, are the two sheet-steel wire-centering devices 90, having the forked opening $90^a$ in their forward ends. These centering devices are secured to the vertical projection $90^b$ of the sliding bar $90^c$. This bar is guided in the standard 89 and carries the roll $90^d$ to engage with the cam-swell $82^c$ of the cam $82^b$, whereby a transverse motion is imparted to said bar for the purpose presently to be more fully described.

$90^e$ is a retractile spring secured to the upright portion of the sliding bar $90^c$ and the standard 89 to keep the roll of said bar engaged with the periphery of the cam $82^b$.

The object of the centering device just described is to bring the two twin wires 66 on each side of the axis of the winding-shafts and on a line with such axis, so that when the eye-forming tool $88^b$ is brought forward the meeting faces of said wires will be in exact line with the point of said eye-forming tool. The centering device 90 will therefore move forward first and locate the wires, as before mentioned, then the bar 88 will be carried forward, and when the shoulder $88^h$ of the rod $88^d$ strikes against the end of the rod $88^f$ the sliding block $89^a$ will be moved forward toward the wires and the jaws $89^d$ $89^e$ will reach such forward position just before the eye-forming tool engages to separate said wires, so that said jaws will form an anvil to support the wires during the splitting or separating operation, as shown at Fig. 10. On the reverse motion to bring the eye-forming tool and the anvil-jaws back to their normal position, as shown at Fig. 9, the pin $88^i$ is secured to the reduced portion $88^e$ within the rod $88^f$ and such pin projects through an elongated slot (not shown) in the upper surface of such rod, so that when the bar 88 moves back said pin will engage that end of said slot farthest from the said anvil-jaws and cause said jaws to be carried back. 91 is an adjusting-screw in the standard 89' to limit such backward movement of the sliding block, and $91^a$ is another adjusting-screw to engage with the upper part of the lever $89^g$ to limit the forward movement of said block.

Figure 18:
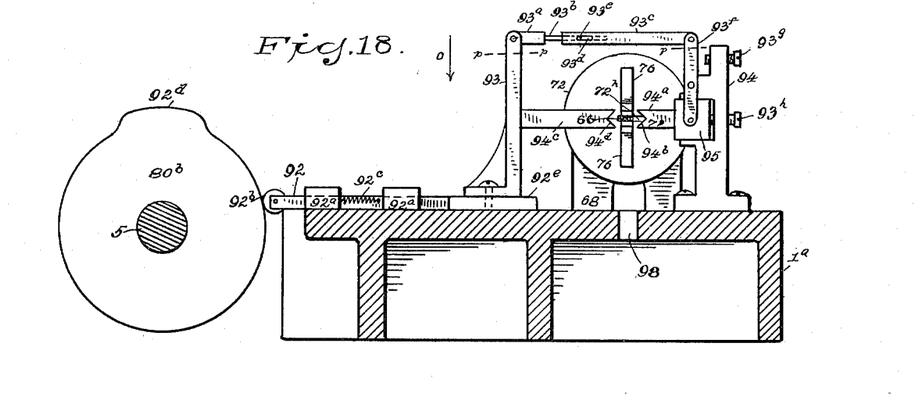
Fig. 18 is a cross-section of the bed through line b of Fig. 1, looking in the direction of arrow f, showing a side elevation of one of the wire-centering devices operating in front of the chuck shown at Fig. 8.
Figure 19:
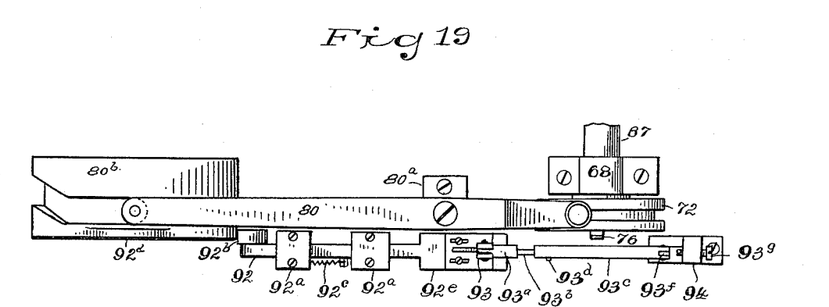
Fig. 19 is an enlarged detail view, looking in the direction of arrow o, Fig. 18, of the wire-centering mechanism, chuck, its operating-lever, and cam, and broken view of the winding-shaft on which such cam is mounted.
Figure 20:
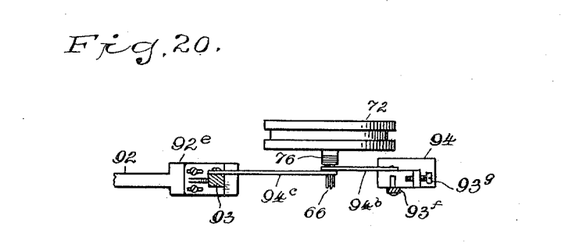
Fig. 20 is an enlarged detail view, also looking in the direction of arrow o of Fig. 18, showing wire-holding chuck, broken view of the lower part of the wire-centering mechanism through line p of Fig. 18, and broken view of the operating-bar therefor.

Devices for guiding or centering the wires between the jaws of the end chucks 72 and 75 are shown at Figs. 18, 19, and 20, and as these centering devices are precisely alike both as regards their construction and operation a brief description of the one shown at Figs. 18, 19, and 20 will suffice. 92 is a bar resting on the upper face of the machine-bed and kept in place by the housings $92^a$. $92^b$ is a roll bearing against the face of the cam $80^b$ and is held thereagainst by the retractile spring $92^c$. $92^d$ is a cam projection on the periphery of the cam $80^b$ to engage with said roll and actuate said bar. $92^e$ is a T-shaped head on the inner end of the sliding bar 92, adapted to support the adjustable standard 93. To the upper end of this standard is attached the rod $93^a$, whose reduced portion $93^b$ telescopes into the rod $93^c$. $93^d$ is an elongated slot in the face of this rod $93^c$, in which the pin $93^e$ of said reduced portion operates to effect the return of those parts connected with rod $93^c$ to their normal position and in substantially the same manner as previously described with respect to the centering device connected with the warp-eye-forming device. $93^f$ is a lever pivotally secured to the standard 94, sliding block 95, and the rod $93^c$. $94^a$ is an arm projecting from this sliding block, and it has the V-shaped opening $94^b$ at its free end. $94^c$ is a similar arm projecting from the standard 93, and it is also provided with the V-shaped opening or notch $94^d$ on its free end. These wire-centering arms are adapted to bring the four strands of wire central with the jaws of their respective chucks. In other words, when the ends of the twin wires are bent around their respective formers $64^a$ and $64^d$ it will be observed, Fig. 23, that there will be four strands parallel with each other due to the folding of the ends of the wires against the body of the heddle. Therefore it is absolutely necessary that the jaws of the chucks should engage all of these wires, and for that purpose the centering devices just described are provided. It will be observed that the said wire-centering arms $94^b$ and $94^c$ pass by each other, as shown at Fig. 20, and are so nicely adjusted with respect to their central position that the wires are brought within the embrace of the jaws of the chucks. $93^g$ is an adjusting-screw to limit the throw of lever $93^f$, while screw $93^h$ limits the travel of the block 95, as shown at Fig. 18.

The wire-centering device just described and operating close to the jaws 76 of the chuck 72 is duplicated by a similar device located close to the jaws 79 of the chuck 75; but owing to the confusion that would arise by placing them in the complicated and reduced drawing shown at Fig. 1 they are therefore omitted from such view. All therefore that is seen in said view are the actuating mechanisms, one of which has already been described. The other consists of the bar 95, which carries the roll $95^a$ to engage with the projection $95^b$, situated on the periphery of the cam $83^b$. $95^c$ is the T-shaped end of said bar, and 96 are the housings therefor.

Figure 14:
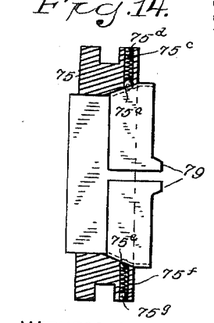
Fig. 14 is an enlarged detail sectional view of one of the wire-gripping devices or chucks.
Figure 15:
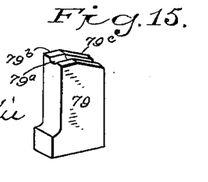
Fig. 15 is a detail perspective view of one of the wire-holding jaws.

The chucks mounted on the winding-shafts are constructed as follows: The shell 75, Fig. 14, is constructed with a groove in its periphery to receive the rolls of its forked lever after the manner of all such devices and by means of which such shell is given a lateral movement to open and close the jaws. The novel feature of these chucks consists in the ball-bearing contact between the taper mouth of the chuck and the jaws. The said jaws, Fig. 15, are provided with the groove $79^a$, which extends along the level portion $79^b$ and the beveled portion $79^c$. In this groove is placed the ball $75^a$, Fig. 14, backed up by the spiral spring $75^c$, placed in a hole drilled through the outer shell of the chuck, and $75^d$ is a short screw that holds said spring in place. The other jaw is likewise provided with ball $75^e$, spring $75^f$, and screw $75^g$. This feature of the ball-bearing will enable the jaws to be opened or closed without that friction which is otherwise unavoidable where two taper-surfaces are brought in contact with each other. In closing the jaws the balls will roll up the inclined surfaces thereof, and when they reach the straight portion said jaws will be closed, so that it will require but the slightest pressure of the clutch-lever to dislodge them. 97, Fig. 8, is a spring adapted to throw the jaws open.

Figure 25:
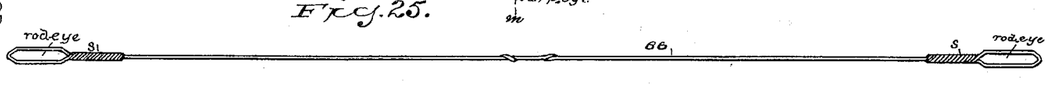
Fig. 25 is the other view of a completed heddle, looking in the direction of arrow u of Fig. 24.

The operation of the machine just described is as follows: All parts being in their normal position, as shown at Fig. 1, the double strand of wire is brought from a reel (not shown) through the feeding-rolls, and these rolls are so geared, as previously described, that a downward movement of the lever 11 will feed forward sufficient wire to form a complete heddle. The wire passes beneath the clamp 39, Fig. 12, through the guide 47 and into the grooves or slots of the chucks and winding-shafts until the end (see Fig. 21) has projected beyond the former $64^c$ far enough to make the rod-eye. The centering devices 90 are then brought forward, the jaws 77 and 78 are caused to grip the wire, and immediately after the warp-eye-forming tool $88^b$ and the anvil-jaws $89^d$ and $89^e$ are also brought forward into engagement, as shown at Fig. 10. When, therefore, the parts thus described are engaged, the winding-shafts will make a quarter of a revolution, bringing the grooves 85 and $85^a$ of the said shafts and chucks to the front, as shown at Fig. 3, so as to bring the double-stranded wires in a horizontal position and the two jaws of the end chucks 72 and 75 in a vertical position, (see also Fig. 23,) so that the ends of the wires may be thrown between said jaws and the body of said wires, together with such ends, may be firmly gripped. In the meantime the cutting-off tool 55 is actuated to sever the wires. Then the initial bending-tools 56 and $56^a$ are brought forward to give a right-angle bend, Fig. 22, to the ends of the wires about the formers $64^a$ and $64^b$, which formers have previously descended in readiness to be engaged with said wires. When the ends of the wires are in the position shown at Fig. 22, the folders, Fig. 23, 46 and $46^b$ are brought forward to embrace the formers $64^a$ and $64^b$ and the wires about the same. It will be observed that the forked opening in these folders, Fig. 21, is smaller at the mouth or entrance than at the bottom. This feature of construction enables the narrow mouth to spring firmly against the wires after said narrow mouth has passed by the main body of the vertically-operated former and by so doing be sure to throw the free ends of the heddle-wires against the main body, so that they may all be uniformly gripped by the outer jaws 76 and 79. After the ends of the wires are in the position just described and before the jaws descend the centering devices (shown at Figs. 18, 19, and 20 and previously described) are brought into engagement with the wires, so as to locate them directly within the gripping-field of the jaws, whereupon said jaws will engage and the winding-shafts will make one complete revolution and halt long enough for the center jaws 77 and 78, Fig. 21, to be released and also the warp-eye-forming tool $88^b$ and the anvil-jaws $89^d$ and $89^e$ to retreat to their normal position. The winding-shafts will then restart to form the longer twists, Figs. 24 and 25, close to the rod-eye of the heddle. When the winding process at the ends or rod-eyes begins, the inevitable tendency is to shorten the distance between the central or warp eye and the said rod-eyes. To compensate for this, or, in other words, to relieve all strain on the twin wires now suspended between the two end formers 64 $64^c$, means are provided whereby said formers may move toward the center of the machine a distance sufficient to overcome this shortening tendency. For this purpose the upper forked end of said formers 64 and $64^b$ (see Figs. 2, 3, 12, and 13) is considerably wider than is necessary to merely support the tilting levers 59 $59^a$ on their pivotal pins 63 $63^a$, so that when the heddle begins to shorten under the twisting process just described the said formers, together with the slides to which they are attached, will be drawn in the direction of the arrows $v\ z$, Figs. 2 and 3, and the space $x$ between the face of one of said forks and the face of the levers 59 and $59^a$ will represent the distance the two slides 49 and $49^a$ will need to travel in order to compensate for the contraction of the heddle due to the said winding process.

Figure 2:
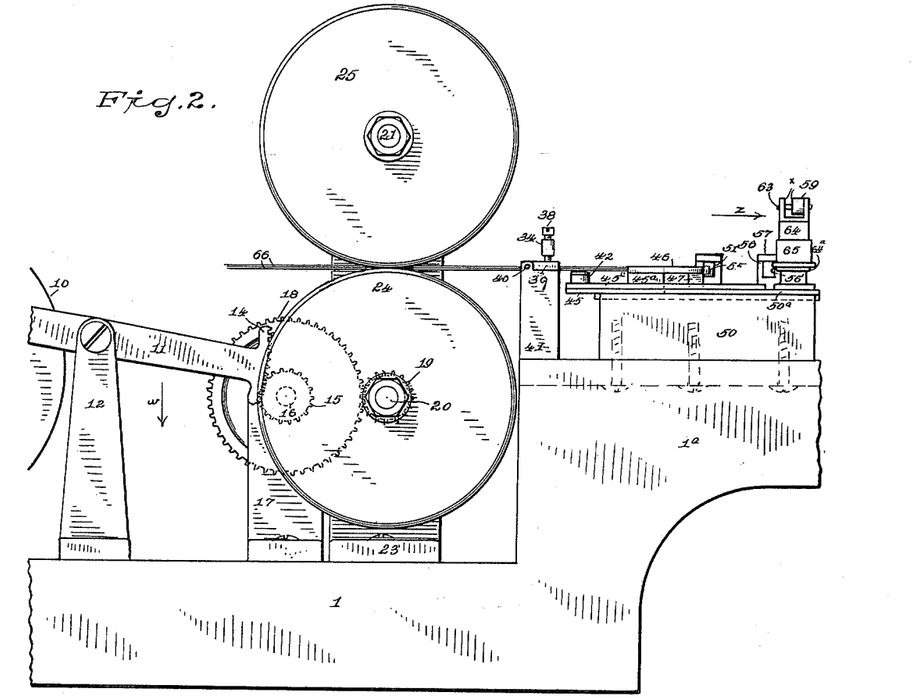
Fig. 2 is a broken front elevation of the machine from line *a* to line *b* of Fig. 1, looking in the direction of arrow *c*, showing operating-cams removed.
Figure 8:
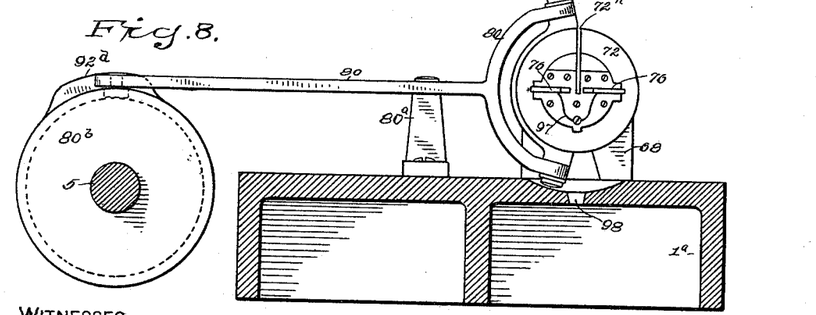
Fig. 8 is a cross-section of the bed and cam-shaft through line *b* of Fig. 1, looking in the direction of arrow *f*, with the wire-centering mechanism removed, showing side elevation of the wire-holding chuck and its clutch-lever and cam.

It will be observed that the several chucks 72 73 74 75, Figs. 2 and 8, are provided with slots $72^h$, $73^a$, $74^a$, and $75^a$ to coincide with the slotted winding-shafts 67 and $67^a$, so that when the winding process is fully completed the said shafts will be temporarily halted in line with the openings 98, Figs. 8, 9, 11, and 18, in the bed of the machine, and while thus halted the rod-eye formers will be carried up, so as to strip the completed heddle therefrom, and such completed heddle will then drop through the bed, after which operation the said shafts will return to their normal position in readiness to receive the necessary complement of wire to form another heddle.

99, Figs. 1, 12, and 13, are retractile springs attached to the two primary end slides to bring them back to their normal position.

It will be understood that the twister or winding shafts may be rotated in opposite direction, if desired, instead of rotating in the same direction, as shown.

Having thus described my invention, what I claim as new, and desire to secure by Letters Patent, is—

1. The combination, in a wire-heddle machine, of a bed, a pair of winding-shafts rotatably mounted thereon, an opening or slot extending longitudinally in said shafts from the center to the circumference, said opening adapted to receive the wire at the center of said shafts and discharge a completed heddle therefrom, mechanism for forming the warp-eye located between said shafts and adapted to operate transversely thereto and independent of said shafts, for the purpose set forth.

2. The combination, in a wire-heddle machine, of two shafts placed in the same axial line, bearings therefor, wire-gripping devices mounted on the ends of said shafts, longitudinal openings extending from the center to the circumference of said shafts and gripping devices for the reception of the wires and the delivery of a completed heddle therefrom, means for operating said shafts and gripping devices, for the purpose set forth.

3. The combination, in a wire-heddle machine, of the twister or winding shafts placed in the same axial line, bearings therefor, wire-gripping devices mounted on said shafts, longitudinal openings extending from the center to the circumference of said shafts and gripping devices, said openings provided for the reception of the heddle-wires during the operation of forming a heddle and also to furnish means for the longitudinal delivery of a completed heddle, means for operating said gripping devices, means for imparting an intermittent motion to said shafts.

4. The combination, in a wire-heddle machine, of winding-shafts placed in the same axial line, bearings therefor, wire-gripping devices mounted on said shafts, longitudinal openings extending from the center to the circumference of said shafts and gripping devices, for the purpose described, warp-eye-forming mechanism operatively placed between said shafts, for the purpose set forth.

5. The combination, in a wire-heddle machine, of winding-shafts placed in the same axial line, bearings therefor, said shafts carrying wire-gripping devices, longitudinal openings from the center to the circumference of said shafts and gripping devices provided for the reception of the wires during the operation of forming a heddle and the delivery of a completed heddle, warp-eye-forming mechanism operatively placed between said shafts, rod-eye-forming mechanism operatively placed at each outer extremity thereof, as shown, for the purpose set forth.

6. In an automatic machine for making wire heddles, the combination of winding-shafts operating in the same axial line and carrying wire-gripping devices, longitudinal openings extending from the center to the circumference of said shafts and gripping devices, for the purpose described, warp-eye and rod-eye forming mechanism operatively mounted, as shown, wire-feeding mechanism adapted to feed the wire through said longitudinal openings, for the purpose set forth.

7. In an automatic machine for making a complete wire heddle, the combination of winding-shafts operating in the same axial line and carrying wire-gripping devices, radial openings extending longitudinally through said shafts and wire-gripping devices, for the purpose described, warp-eye and rod-eye forming mechanism operatively mounted, as shown, wire-feeding mechanism adapted to feed, at one stroke, sufficient wire through said openings to make a complete heddle, for the purpose set forth.

8. In an automatic machine for making a complete wire heddle, the combination of independently-operating winding-shafts placed in the same axial line and carrying wire-gripping devices, radial openings, as shown, extending longitudinally through all of said shafts and gripping devices for the reception of the wires to be acted upon and the delivery of a completed heddle, warp-eye and rod-eye forming mechanism, means for operating all of such mechanism, and means for independently operating said gripping devices, wire-feeding mechanism, for the purpose set forth.

9. In an automatic machine for making a complete heddle from parallel strands of wire soldered together, the combination of independently-operating winding-shafts carrying wire-gripping devices operating in the same axial line, radial openings, extending longitudinally through said shafts and their gripping devices as shown and for the purpose described, warp-eye and rod-eye forming mechanism, means for operating the same wire-feeding mechanism adapted to feed the necessary complement of wire through said shafts and gripping devices at a single stroke, for the purpose set forth.

10. In an automatic machine for making a complete heddle from parallel strands of wire soldered together, the combination of independently-operating shafts carrying wire-gripping devices, radial openings extending longitudinally through said shafts and their gripping devices, as shown and for the purpose described, warp-eye mechanism consisting of a piercing-tool adapted to be carried across the feeding-line of the wires and separate the strands, spring-jaws adapted to serve as a backing or anvil to support said wires during said separating operation, means for engaging the gripping devices on each side of said piercing-tool with the wires, and means for returning all of such operative parts to their normal position, for the purpose set forth.

11. In an automatic machine for making a complete heddle from parallel strands of wire soldered together, the combination of independently-operating winding-shafts carrying wire-gripping devices or chucks on their ends, radial openings in each of said shafts and chucks, as shown and for the purpose described, wire-feeding mechanism, warp-eye-piercing tool, a spring-actuated backing or anvil for supporting the wire and to admit the point of said piercing-tool, wire-centering device to aline the wires with said eye-piercing tool, for the purpose set forth.

12. In an automatic machine for making heddles from parallel strands of wire soldered together, the combination of independently-operating shafts carrying wire-gripping devices on their ends, radial openings in each of said shafts and wire-gripping devices, as shown and for the purpose described, wire-feeding mechanism, warp-eye-forming mechanism, rod-eye-forming mechanism consisting of a cutting-off tool, vertically-operating formers, initial bending-tools to form a right-angle bend against said formers, eye-closers adapted to close the wires about such formers and throw the free ends thereof against the main body of the wire and within the field of the outer gripping devices, means whereby the said formers are moved toward the said wire-gripping devices to compensate for the winding process, for the purpose set forth.

13. In an automatic machine for making wire heddles, the combination with wire-twisting and wire-gripping devices, of rod-eye-forming mechanism operatively placed on each side of said wire-twisting mechanism and wire-gripping mechanism and consisting of primary slides carrying supports to receive vertically-operating eye-formers, means for operating said formers, a wire-guide on one of said slides, secondary slides operatively mounted on the first-named slides, and carrying eye closers or folders adapted to close the wire about such folders, initial wire-bending devices operating across the feeding-line of the wire, cutting-off tool adapted to sever the wires in close proximity to the said guide, means on said formers whereby the said primary slides may be moved forward to compensate for the winding or twisting process of the rod-eyes, a support for said primary slides and means for operating all of said devices, for the purpose set forth.

14. In an automatic machine for making wire heddles, the combination with wire-gripping devices, of automatic wire-centering devices placed in close proximity to said gripping devices, and means for operating such wire-centering devices, for the purpose set forth.

15. In an automatic machine for making wire heddles, the combination of wire-gripping devices, wire-centering devices in close proximity to said gripping devices and the rod-eye-forming mechanism, and adapted to guide the wires into the field of the said wire-gripping devices, said centering devices consisting of forked arms adapted to operate on each side of the wire-feeding line, supports for said arms and means for operating the same and adjusting the travel thereof, for the purpose set forth.

16. In an automatic machine for making wire heddles, the combination with the eye-forming tool for separating the strands of wire, of a wire-centering device, a spring-actuated support or anvil for the wire to sustain the pressure of the said eye-forming tool, said anvil consisting of a pair of jaws adapted to be opened by said tool so as to receive the end of said tool and yet sustain the wires, a movable support for said jaws and means for operating the same and adjusting the travel thereof, for the purpose set forth.

17. In an automatic machine for making wire heddles, the combination with the wire-twisting and wire-gripping mechanism and vertically-operating rod-eye formers, of movable folders adapted to embrace said formers to fold the wires about the same, means for operating all of said devices, for the purpose set forth.

18. In an automatic machine for making wire heddles, the combination with the wire gripping and winding mechanism, vertically-operating rod-eye formers, of movable elastic folders adapted to embrace said formers and fold the wire about the same, for the purpose set forth.

19. In an automatic machine for making heddles from parallel strands of wire soldered together, the combination of a bed, independently-operating shafts carrying wire-gripping devices, means for imparting an intermittent motion to said shafts, radial openings in said shafts and gripping devices, as shown and for the purpose described, warp-eye-forming mechanism, rod-eye-forming mechanism, wire-centering mechanism, wire-feeding mechanism, cutting-off mechanism, all combined so that the wires are fed through the said radial slots the proper distance required to form a heddle, the inner gripping devices engaging the wires and the warp-eye mechanism severing the strands, the shafts making one-quarter revolution and halting long enough for the rod-eye-forming devices to operate, then said shafts making one complete revolution and halting to allow the warp-eye-forming mechanism to be disengaged, said shaft further rotating until sufficient number of turns are given to the rod-eye ends of the heddle and said shafts halted with the said radial slots at the lowest point so as to deliver a completed heddle therefrom, for the purpose set forth.

20. In an automatic machine for making wire heddles from parallel strands of wire soldered together, the combination of a bed carrying a driving-shaft and a cam-shaft, twister or winding shafts carrying wire-gripping devices consisting of chucks mounted on said shafts, said shafts and chucks provided with a radial slot, as shown and for the purpose described, adjustable warp-eye-forming mechanism operating between said shafts, rod-eye-forming mechanism consisting of vertically-operating formers, initial bending-tools, cutting-off tool, forked-shaped rod-eye folders, means for operating the same, wire-centering devices, means for imparting an intermittent motion to said winding-shafts, wire-feeding mechanism, for the purpose set forth.

21. In an automatic machine for making wire heddles, a chuck having jaws adapted to grip the wire, said jaws having the straight portion $79^b$ and the inclined surface $79^c$, groove $79^a$, spring-actuated balls $75^a$ and $75^c$ adapted to operate in said grooves, for the purpose set forth.

22. In an automatic machine for making wire heddles, the combination with the rod-eye-forming mechanism, of vertically-operating formers having lower beveled ends to force the heddle-wires back of said formers when descending, for the purpose set forth.

23. In an automatic machine for making wire heddles, the combination of wire-feeding mechanism consisting of the shaft 8 operatively mounted in the standard 9, cam 10 mounted on said shaft, segment-lever 11 carrying a segment-gear adapted to engage a pinion on shaft 16, whose gear 18 registers with a pinion on one of the feed-roll shafts, ratchet feed mechanism also mounted on one of said shafts, feed-rolls, as shown, all combined to feed, by one stroke of said segment-lever, a full complement of wire to make a complete heddle, for the purpose set forth.

Signed at Bridgeport, in the county of Fairfield and State of Connecticut, this 15th day of October, A. D. 1898.

FRANKLIN B. SHUSTER.

Witnesses:
 DAVID M. LACKIE,
 A. L. ADAMS.